(12) United States Patent
Valery et al.

(10) Patent No.: US 10,751,643 B2
(45) Date of Patent: Aug. 25, 2020

(54) FLUID DISTRIBUTION UNIT FOR A CHROMATOGRAPHY COLUMN

(71) Applicant: NOVASEP PROCESS, Pompey (FR)

(72) Inventors: Eric Valery, Saulxures-les-Nancy (FR); Cédric Prieur, Genas (FR); Nicolas Pautal, La Balme les grottes (FR); Stéphane Oliveira, Montluel (FR)

(73) Assignee: NOVASEP PROCESS, Pompey (FR)

( * ) Notice: Subject to any disclaimer, the term of this patent is extended or adjusted under 35 U.S.C. 154(b) by 567 days.

(21) Appl. No.: 15/310,388

(22) PCT Filed: May 13, 2015

(86) PCT No.: PCT/EP2015/060710
§ 371 (c)(1),
(2) Date: Nov. 10, 2016

(87) PCT Pub. No.: WO2015/173370
PCT Pub. Date: Nov. 19, 2015

(65) Prior Publication Data
US 2017/0173495 A1   Jun. 22, 2017
US 2018/0036652 A9   Feb. 8, 2018

(30) Foreign Application Priority Data
May 16, 2014  (FR) ..................... 14 01117

(51) Int. Cl.
*B01D 15/10*   (2006.01)
*B01D 15/14*   (2006.01)
(Continued)

(52) U.S. Cl.
CPC ............. *B01D 15/14* (2013.01); *B01D 15/10* (2013.01); *B01D 15/22* (2013.01); *B01D 24/008* (2013.01);
(Continued)

(58) Field of Classification Search
CPC ........ B01D 15/14; B01D 15/22; B01D 15/18; B01D 15/1821; B01D 24/14;
(Continued)

(56) References Cited

U.S. PATENT DOCUMENTS 4,378,292 A * 3/1983 Haase .................... B01D 15/00
                                                      210/266
4,582,608 A    4/1986 Ritacco
(Continued)

FOREIGN PATENT DOCUMENTS

FR      2708480 A1   2/1995
FR      2933000 A1   1/2010
(Continued)

OTHER PUBLICATIONS

JP2016-567774—Office Action dated Jan. 8, 2019, 14 pages.
(Continued)

*Primary Examiner* — Benjamin L Lebron
(74) *Attorney, Agent, or Firm* — Haynes Beffel & Wolfeld LLP; Andrew L. Dunlap

(57) ABSTRACT

The invention relates to a fluid distributor (9, 10) for a column (1) comprising at least one cell (2) containing a bed of particles (3), the fluid distributor (9, 10) comprising: —a floor (11, 21) comprising at least one injection point (15, 25) providing a fluidic connection on either side thereof; —a layer of a resistive medium (12, 22) fixed on one face of the floor (11, 21), the resistive medium being permeable to the fluid; —a spacing device (13, 23) inserted between the floor (11, 21) and the layer of resistive medium (12, 22) and maintaining a space for the circulation of the fluid between the floor (11, 21) and the layer of resistive medium (12, 22). The invention also relates to a column, in particular a chromatography column, provided with this fluid distributor.

19 Claims, 7 Drawing Sheets

Figure 1:
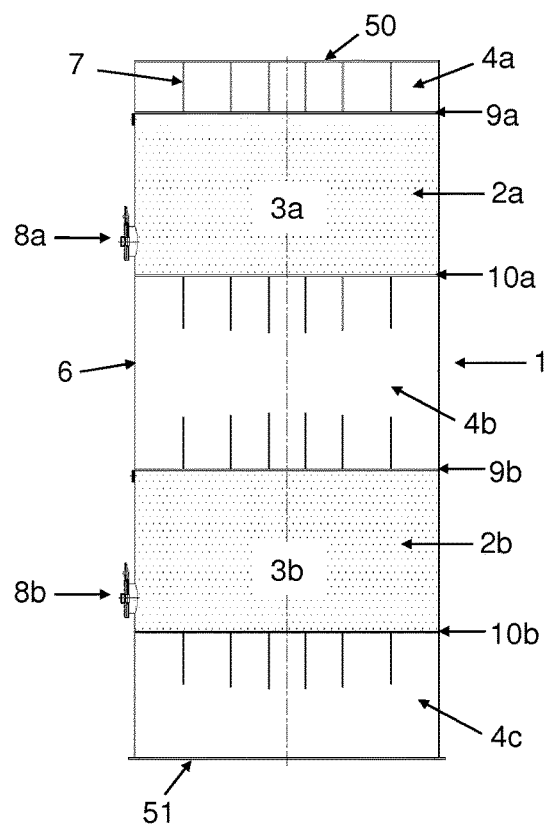

(51) Int. Cl.
| | |
|---|---|
| *B01D 15/22* | (2006.01) |
| *B01D 24/00* | (2006.01) |
| *B01D 24/14* | (2006.01) |
| *B01D 53/04* | (2006.01) |
| *G01N 30/16* | (2006.01) |
| *G01N 30/60* | (2006.01) |
| *B01D 15/18* | (2006.01) |

(52) U.S. Cl.
 CPC ......... *B01D 24/14* (2013.01); *B01D 53/0423* (2013.01); *G01N 30/16* (2013.01); *G01N 30/60* (2013.01); *G01N 30/6017* (2013.01); *B01D 15/1821* (2013.01)

(58) Field of Classification Search
 CPC .. B01D 24/008; B01D 2201/44; B01D 15/10; B01D 53/0423; G01N 30/16; G01N 30/60; G01N 30/6017
 See application file for complete search history.

(56) References Cited

U.S. PATENT DOCUMENTS

| | | | |
|---|---|---|---|
| 5,354,460 | A | 10/1994 | Kearney et al. |
| 2004/0140007 | A1 | 7/2004 | Bellqvist et al. |
| 2004/0140252 | A1 | 7/2004 | Gebauer |
| 2006/0055222 | A1 | 3/2006 | Bonk et al. |
| 2006/0124550 | A1 | 6/2006 | Paananen et al. |
| 2007/0246428 | A1 | 10/2007 | Klepp et al. |
| 2008/0017579 | A1* | 1/2008 | Hermansso ............ B01D 15/14 210/656 |
| 2008/0041780 | A1* | 2/2008 | Frey ....................... B01D 15/14 210/284 |
| 2011/0159232 | A1 | 6/2011 | Madeleine |
| 2013/0161248 | A1* | 6/2013 | Eriksson ............ G01N 30/6017 210/198.2 |

FOREIGN PATENT DOCUMENTS

| | | |
|---|---|---|
| FR | 2961112 A1 | 12/2011 |
| JP | S6129837 B2 | 7/1986 |
| JP | H09501868 A | 2/1997 |
| JP | H1028847 A | 2/1998 |
| JP | 2008520427 A | 6/2008 |
| WO | 9503867 A1 | 2/1995 |
| WO | 9948599 A1 | 9/1999 |
| WO | 0050144 A1 | 8/2000 |
| WO | 0292188 A1 | 11/2002 |
| WO | 2006055222 A1 | 5/2006 |

OTHER PUBLICATIONS

PCT/EP2015/060710—International Search Report dated Nov. 19, 2015, 3 pages.
PCT/EP2015/060710—Written Opinion of the International Searching Authority dated Oct. 28, 2016, 8 pages.
PCT/EP2015/060710—International Preliminary Report on Patentability dated Nov. 22, 2016, 8 pages.

* cited by examiner

FLUID DISTRIBUTION UNIT FOR A CHROMATOGRAPHY COLUMN

FIELD OF THE INVENTION

The present invention relates to a unit for distributing fluid for a column including a fixed bed of particles, such as a chromatography column.

TECHNICAL BACKGROUND

Chromatography is a separation method based on different retentions of compounds of a mixture on a stationary phase. The compounds are separated by percolating a liquid, gaseous or supercritical eluent in a device (in general a cylindrical column, or one with another geometry) filled with stationary phase. The compounds progress more or less rapidly in the column depending on their displacement kinetics and on their affinity with the chromatography support. Thus, they get more or less separated.

This method is widely applied as an analysis technique in order to identify and quantify components in a mixture. It is also widely used as an industrial purification technique.

As the chromatography column is filled with a stationary phase, this is where the separation of the different compounds takes place. When the separation is carried out, the compounds and the eluent should therefore be introduced into the column, and then extracted therefrom. To this end, supply and collection systems are used, placed at the input and at the output of the column, through which fluids travel during separation.

An industrial chromatography column generally consists of a cylindrical barrel closed on each side by floors. Optionally a piston may replace one of the floors, in certain applications, notably pharmaceutical applications.

The column is filled with a stationary phase (generally beads having an average size of a few micrometers to a few millimeters depending on the applications) through which compounds to be separated and the eluent percolate. One or several separation cells may be present in a same column. The supply and collection networks are located on the floors of the column and support the stationary phase of each separation cell. These networks are also used for distributing and collecting fluids on the entire surface of the stationary phase at any time, as uniformly as possible. Separation efficiency is therefore influenced by the design of these networks, since it is necessary to inject an eluent from a conduit on the whole surface of the column floor or to draw off this eluent from the floor to a conduit. The supply and collection networks are designated a distributor or distribution network, without any distinction.

Documents U.S. Pat. No. 5,354,460, WO 99/48599, US 2007/0246428 and US 2006/124550 disclose designs in which the fluid injected into the network is oriented via distribution channels of approximately equal lengths to one or several sub-distributors in order to ensure an approximately identical injection time for all current lines on the stationary phase. Thus, quasi-uniformity of travel distances for a given compound between its entry point into the column and its injection strictly speaking onto the stationary phase is ensured. These systems nevertheless entail a significant cost related to the manufacturing of these networks when the columns have a large diameter, because of the multiplication of the sub-distributors.

Document WO 02/92188 discloses a distribution system with several stages, wherein the input or output flow is divided at each stage in two concentric grooves (case of cylindrical columns) or perimeter grooves (case of columns having a square section), which may optionally be subdivided in the next stage, so as to allow the fluid to travel a relatively homogenous distance before reaching the bed of stationary phase. This type of system may also entail a significant cost because of the complexity of the distributor with several stages, and it induces a loss of efficiency in certain cases.

Document WO 2006/055222 discloses distributors between the cells of a column, which consist of one or several upper grids (or perforated plates) supporting the bed of particles, of one or several deflection plates, and one or several lower grids (or perforated plates) making it possible to ensure distribution of the liquid before percolation in the lower cell. In these distributors, a space separates the deflection plate(s) of the lower grid(s).

Document FR 2 933 000 discloses a system of the same type, in which a baffle may be inserted in the distributor, in order to homogenize the length of the flow lines in each separation cell and to reduce dispersion.

These distributors have a large volume of liquid because of the interstitial spaces, which increases the dispersion of the fluid and reduces separation efficiency.

Documents WO 00/50144 and WO 2011/159232 disclose distributors of a generally conical shape. In some cases, the volume inside the distribution cone may be filled with a porous material. These distributors also have a large volume, and the cost for manufacturing the floor (by forging and/or machining) and optionally the interstitial porous material is generally high.

In the context of industrial chromatography columns of so-called "high performance", i.e. equipped with at least one movable piston and using particles of small dimensions (in general from 5 to 50 μm), and having a reduced overall size (typically of the order of a maximum diameter of 1 meter), the fluid is injected through a central conduit (or several injection points distributed on the diameter) into a compression chamber of a small thickness (generally a few mm), adjacent to a floor or a machined piston. The fluid is subject to pressure generated by a resistive distributor (generally a superposition of low porosity grids).

This resistive system of a small volume forces the fluid to be distributed in the compression chamber within a very short time, which provides quasi-uniform injection on the stationary phase. In order to ensure a constant thickness of the compression chamber, the ends of the column (floor or piston) consist of assemblies of accurately machined parts which are not welded together.

This device can however not be contemplated for columns of large diameter for which the floors are maintained by welding at the barrel of the column. Indeed, the barrel of the column is made in a rolled and welded metal sheet to which the floors (at the ends or intermediate between both cells) are then also welded. By design, the horizontality and the height of the floor are not controlled and the floor has surface undulations of a few millimeters. This distribution method therefore seems to be incompatible with the columns of large diameter.

There is a need for columns (notably of a large diameter) of the chromatography column type, equipped with fluid distributors allowing efficient fluid distribution over the whole surface of the column, and of a simpler design (and therefore entailing less cost) than the columns of the state of the art. It is also desirable to facilitate the assembling and maintenance operations.

SUMMARY OF THE INVENTION

The invention firstly relates to a fluid distributor for a column including at least one cell containing a bed of particles, the fluid distributor comprising:
- a floor including at least one injection point ensuring a fluidic connection on either side thereof;
- a resistive medium layer attached to the floor and formed with a plurality of juxtaposed resistive medium parts on the face of the floor, the resistive medium being permeable to the fluid;
- a spacing device inserted between the floor and the resistive medium layer and maintaining a spacing for fluid circulation between the floor and the resistive medium layer.

According to an embodiment:
the floor is not machined; and/or
the floor has a diameter greater than 1 m, preferably greater than 2 m, and more preferably greater than 3 m, most preferably greater than 4 m.

According to an embodiment, the resistive medium layer includes from two to two hundred, and preferably from five to fifty resistive medium parts.

According to an embodiment, the fluid distributor comprises attachment elements maintaining the assembly formed by the resistive medium layer and the spacing device against the floor; the attachment elements preferably comprising junction elements covering adjacent resistive medium parts, said junction elements more preferably comprising at least one supporting plate and one joint.

According to an embodiment, the spacing between the floor and the resistive medium layer is substantially constant over the totality of the surface of the floor.

According to an embodiment, the floor is substantially planar, and preferably the floor has deviations from 0.5 to 5 mm, preferably from 1 to 4 mm with respect to a planar geometry.

According to an embodiment, water flowing through the fluid distributor at 1 m/h at 20° C. induces a pressure drop of less than or equal to 1 bar, preferably less than or equal to 200 mbar, more particularly less than or equal to 50 mbar and ideally less than or equal to 20 mbar.

According to an embodiment, the spacing device generates a first pressure drop along current lines between the floor and the resistive medium layer, a second pressure drop being generated in the resistive medium layer, the first pressure drop being less than the second pressure drop, preferably at least twice less, more particularly at least ten times less and ideally at least one hundred times less.

According to an embodiment, the fluid distributor includes a deflector placed in at least one injection point.

According to an embodiment, the spacing device is composed of a set of supports, of a grid or of a foam, and preferably consist in a grid or in juxtaposed grid parts.

According to an embodiment, the resistive medium parts consists of one or several webs, perforated plates, powders and a combination thereof.

According to an embodiment, the floor includes a plurality of injection points, preferably at least three, more preferably at least five.

The invention also relates to a column including at least one cell, preferably a plurality of cells, each cell including a bed of particles with on either side a fluid supply device and a fluid collection device, at least one of these devices being a fluid distributor as described above.

According to an embodiment, in each cell, both the fluid supply device and the fluid collection device are fluid distributors as described above.

According to an embodiment, the column comprises fluid conduits connected to the injection points of the fluid distributors and allowing fluid to be brought to the cell or fluid to be collected from the cell.

According to an embodiment, the floors of the fluid distributors are attached, and preferably are welded, to supporting beams.

According to an embodiment, the column is a chromatography column, preferably a liquid phase chromatography column.

According to an embodiment, the column is a chemical reactor.

The invention also relates to the use of the above column in a chromatography process, ion adsorption or exchange process, preferably in a multi-column chromatography process, such as a simulated moving bed process or a continuous ion exchange process; or in a chemical synthesis process on a fixed bed, preferably in a catalytic process.

According to an embodiment, said use is in a batch, sequential, co-current or counter-current mode.

The invention also relates to a method for setting up a fluid distributor in a column including at least one cell intended to contain a bed of particles, comprising:
- setting into place a spacing device against the internal face of a floor of the cell, the floor including at least one injection point ensuring a fluidic connection on either side thereof;
- setting into place a resistive medium layer above the spacing device, by juxtaposing resistive medium parts, the resistive medium being permeable to the fluid;
- attaching the resistive medium layer on the floor so as to secure the spacing device between the resistive medium layer and the floor, the spacing device maintaining a space for fluid circulation between the floor and the resistive medium layer.

According to an embodiment, the fluid distributor is as described above and/or the column is as described above.

According to an embodiment, the setting into place of the resistive medium layer comprises introducing the resistive medium parts into the cell through a manhole; the resistive medium parts being preferably folded so as to be introduced through the manhole.

According to an embodiment, the setting into place of the spacing device and the setting into place of the resistive medium layer are carried out:
- either sequentially, one or several parts of the spacing device being first positioned against the internal face of the floor and then the resistive medium parts being attached above the spacing device;
- or simultaneously, one or several parts of spacing device being preassembled with the resistive medium parts before positioning and attaching the spacing device against the internal face of the floor together with the resistive medium layer.

The present invention makes it possible to overcome the drawbacks of the state of the art. More particularly it provides fluid distributors for columns (notably of a large diameter) of the chromatography column type, which provide efficient distribution of the fluid over the whole surface of the column, and which are of a simpler design and lesser cost than prior art columns. Assembling and maintenance operations on these fluid distributors are facilitated.

This is made possible owing to the attachment of a resistive medium layer on a face of a floor facing a bed of particles of the column, and the insertion of a spacing device between the resistive medium layer and the floor in order to maintain a spacing for fluid circulation. The resistive medium layer is formed with several juxtaposed parts, which makes its assembling easier.

These distributors have a small volume and a low cost, and they make it possible to manufacture large diameter columns having improved performances.

SHORT DESCRIPTION OF THE FIGURES

FIG. 1 schematically illustrates a column provided with fluid distribution devices according to the invention.

Figure 2:
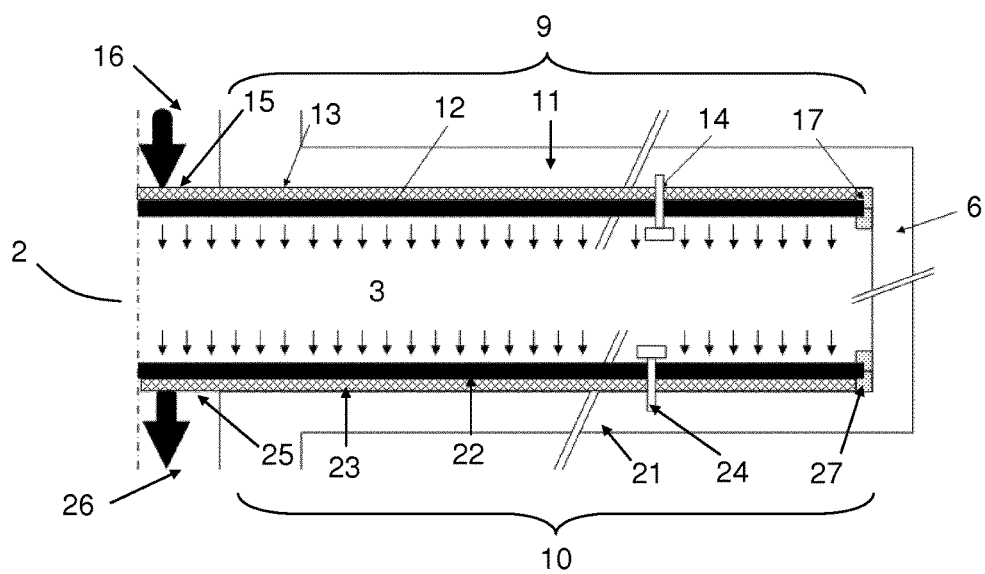

FIG. 2 schematically illustrates a column cell including two fluid distribution devices according to the invention.

Figure 3:
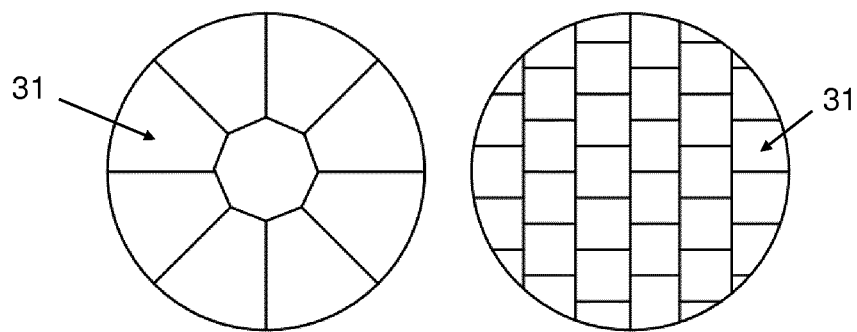
Figure 4:
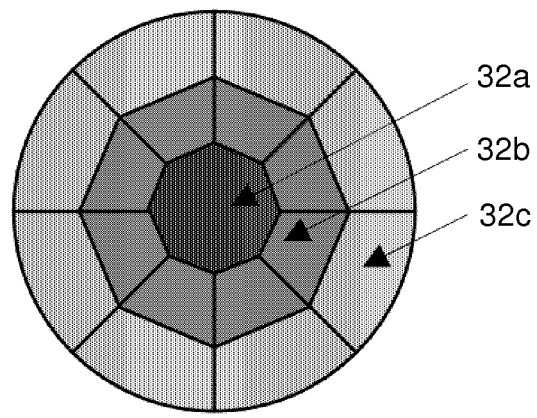

FIGS. 3 and 4 schematically illustrate embodiments of resistive medium layers used in the invention.

Figure 5:
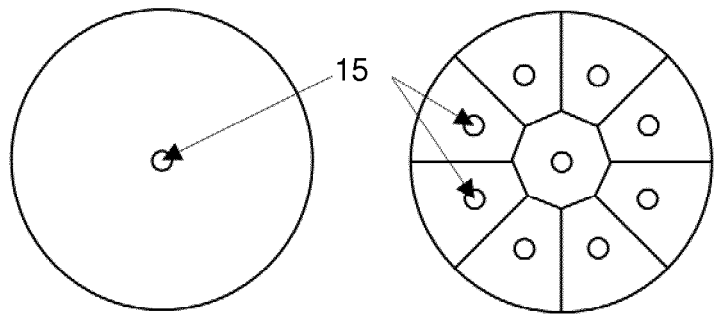

FIG. 5 schematically illustrates examples of arrangements of injection points which are possible within the scope of the invention.

Figure 6:
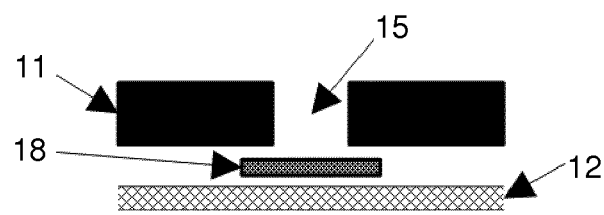
Figure 7A:
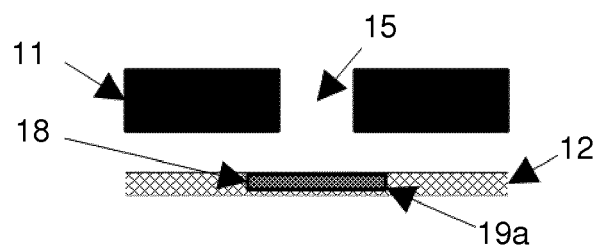
Figure 7B:
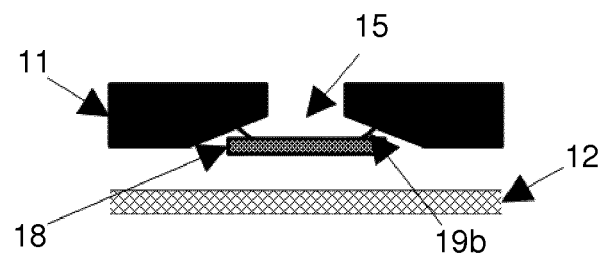

FIGS. 6, 7a and 7b schematically illustrate embodiments including a deflector.

FIGS. 8a to 8j schematically illustrate possible attachment modes of resistive medium parts to each other and to the floor, according to the invention.

DESCRIPTION OF EMBODIMENTS OF THE INVENTION

The invention is now described in more detail and in a non-limiting manner in the description which follows.

Making reference to FIG. 1, the invention relates to a column 1, which, in the illustrated embodiment, is a multi-stage column. Alternatively, the column may be single-staged. Column 1 comprises a main axis, which generally is a vertical axis. It is preferably a chromatography column, or else a chemical reactor column.

Column 1 includes a plurality of cells 2a, 2b (two on the drawing), spaced along the main axis of column 1. In the case of a single-stage column, there would be only one cell. Each cell 2a, 2b includes a respective bed of particles 3a, 3b. The bed of particles 3a, 3b forms a stationary phase, which where the chemical reaction and/or the chromatographic separation takes place.

The particles of the particle bed preferably have an average volume diameter Dv50 greater than or equal to 30 µm, or greater than or equal to 50 µm, or greater than or equal to 100 µm, or greater than or equal to 200 µm, or greater than or equal to 300 µm.

According to an alternative not shown, column 1 includes more than two cells, for example three cells or more than three cells.

Column 1 according to the invention is preferably cylindrical along the main axis. According to an embodiment, the section of column 1 is circular. According to other embodiments, column 1 (or at least one of its cells 2a, 2b) may have a square, rectangular, oblong section or even may have a conical shape for example.

The diameter of the column may preferably be greater than or equal to 1 m; or greater than or equal to 2 m; or greater than or equal to 3 m; or greater than or equal to 4 m; or greater than or equal to 4 m. By "diameter of the column", is meant here the external diameter of the column. In the case of a column which is not cylindrical with a circular section, the diameter is meant from the maximum dimension of the column in a section perpendicular to its main axis. For example, for a rectangular or square section, the diameter refers to the diagonal.

Intercellular spaces 4a, 4b, 4c are positioned between adjacent cells 2a, 2b and optionally at the upper and lower ends of column 1.

Each cell 2a, 2b is delimited above and below with two respective fluid distribution devices 9a, 10a, 9b, 10b, i.e. one fluid supply device 9a, 9b and one fluid collection device 10a, 10b. The term "fluid distribution" is used generically in the application for designating fluid supply (dispersion of fluid at the inlet into a cell) or fluid collection (drawing off fluid stemming from a volume of the cell, for example from the totality of the cell).

Generally, fluid flows through a cell 2a, 2b from the top to the bottom, the fluid supply device 9a, 9b being positioned at the top and the fluid collection device 10a, 10b being positioned at the bottom. However, a different orientation (for example from the bottom to the top) is also possible.

These fluid distribution devices are associated with respective floors, which retain the bed of particles 3a, 3b in the cell 2a, 2b. In the present application, the term "floor" is equally used for the lower wall or for the upper wall (ceiling) of the cell.

According to the invention, at least one fluid distribution device of the column is as described above. For example, at least one fluid distribution device per cell is as described below. Other fluid distribution devices (not according to the invention, called here "conventional" devices) may be used in combination with fluid distribution devices according to the invention (as described below).

According to an embodiment, each cell includes a fluid distribution device according to the invention and another conventional fluid distribution device. In this case, the fluid distribution device according to the invention may notably be the fluid supply device.

According to another embodiment, all fluid distribution devices of a cell, or all fluid distribution devices of the column, are according to the invention (and therefore as described below).

In an alternative of the invention at least one floor of a cell is not machined. In an alternative of the invention, no cell floor is machined.

Column 1 includes a main body 6 or ferrule or barrel which extends in the direction of the main axis. Preferably, it also includes supporting beams 7 which maintain at least one cell floor, preferably all cell floors secured to the main body 6 of column 1. Supporting beams 7 may be attached to the main body 6 by welding or by any other suitable means.

The main body 6 is closed at each end with a respective end floor 50, 51.

According to a preferred alternative of all the embodiments of the invention, each floor is secured to the main body 6. Thus, preferably, the cells 2a, 2b of column 1 are without any piston.

Manholes 8a, 8b may be provided in one or several locations of column 1, notably for providing access to the various cells 2a, 2b.

Fluid transport conduits, not shown in the figure, make it possible to supply each cell 2a, 2b with fluid and collect fluid from each cell 2a, 2b. Such fluid transport conduits are notably generally provided in the inter-cellular spaces 4a, 4b, 4c.

There may be a single fluid circulating in each cell 2a, 2b, or else, in an alternative, several fluids introduced and/or collected by various conduits (simultaneously or separately over time).

Preferably, by "fluid" is meant a liquid, which may for example be an aqueous solution or an organic phase or an aqueous/organic mixture.

Alternatively, the fluid may be a gas or a supercritical fluid. Mixtures of the above fluids may also be contemplated.

The fluid may be a mixture of reagents, a mixture of reaction products, a mixture of compounds to be separated, water, an eluent, a desorbing agent, a washing fluid, etc.

Thus, any fluid flow entering or leaving each cell 2a, 2b may be channeled in one or several conduits, or optionally be totally or partly injected into or extracted from the column.

In an alternative, a flow of fluid (such as for example an eluent, a desorbing agent or a mixture to be separated) is combined with all or part of a flow of fluid leaving a cell and introduced into another cell—adjacent or not.

The means for extracting or adding fluid are typically those used by one skilled in the art depending on the application and on the size of the facility, such as for example manifolds of two- or several-way valves, either rotary or not, manual or automated, for which the design and the materials are adapted to the application.

In another alternative, the cells of a column communicate with each other via orifices made in one or several floors, a mixing box being optionally present at a floor or between floors in order to extract or add flows between two cells.

With reference to FIG. 2, a cell 2 is delimited by two respective fluid distribution devices 9, 10 according to the invention, i.e. a fluid supply device 9 and a fluid collection device 10; and it comprises a bed of particles 3.

Each of these fluid distribution devices 9, 10 includes a respective floor 11, 21, i.e. an upper floor 11 and a lower floor 21.

Preferably each floor 11, 21 is substantially planar. However, preferably, the floor 11, 21 has deviations or variations comprised between about 0.5 and 5 mm, preferably between about 1 and 4 mm, with respect to a planar geometry. The reference planar geometry is the theoretical plane tangent to the maximum surface area of the floor 11, 21. The variations or deviations correspond to the maximum distance between the floor 11, 21 and the reference planar geometry.

These variations are preferably localized, they may notably be found at the attachment points (for example welding points) of the floor 11, 21 to the supporting beams. In these points, the floor 11, 21 tends to form bumps or recesses with respect to the reference planar geometry.

At least one fluid supply conduit 16 (preferably provided with one or several valves) is provided for supplying the cell 2 with fluid. It opens onto an orifice made in the upper floor 11, at an injection point 15. An injection point corresponds to a location where the fluid flows through the cell floor; this is the interface between a conduit and a cell. The term of "injection point" is used in the present application equally for a fluid arrival or a fluid sampling.

The fluid supply device 9 ensures distribution of fluid from the fluid supply conduit 16 over the entirety of the surface of the bed of particles 3, a surface which is perpendicular to the general direction of flow (in principle corresponding to the main axis of the column).

At least one fluid collection conduit 26 (preferably provided with one or several valves) is provided for drawing off fluid at the outlet of the cell 2. It originates from an orifice made in the lower floor 21, at an injection point 25.

The fluid collection device 10 ensures collection of fluid from the entirety of the surface of the bed of particles 3 which is perpendicular to the general direction of flow, and its drawing off in the fluid collection conduit 26.

The fluid supply device 9 includes a layer of a resistive medium 12 which is attached to the upper floor 11 on the totality (or substantially the totality) of the surface thereof, on its internal face (i.e. facing the bed of particles 3). Between the resistive medium layer 12 and the upper floor 11, a spacing device 13 is inserted. The latter maintains a gap for the circulation of fluid between the upper floor 11 and the resistive medium layer 12.

Preferably, the spacing device 13 is in contact both with the upper floor 11 and the resistive medium layer 12.

Preferably, the resistive medium layer 12 is directly in contact with the bed of particles 3.

The space comprised between the injection point 15 and the resistive medium layer 12 may be described as a "compression chamber". The fluid is distributed in the compression chamber before flowing through the resistive medium layer. There is preferably a single compression chamber substantially covering the entirety of the surface of the distributor.

In an alternative of the invention, the number of compression chambers is equal to, preferably less than, the number of resistive medium parts.

The resistive medium is a porous material.

The resistive medium is impermeable to the stationary phase (particles of the bed of particles 3) and is permeable to the fluid. The pressure drop generated by the resistive medium layer is typically less than or equal to 1 bar (or to 500 mbar or to 200 mbar or to 100 mbar or to 50 mbar or to 20 mbar) for a water velocity at 20° C. of 1 m/h.

The resistive medium may consist in a non-exhaustive way, of webs and/or powders and/or perforated plates, in metal and/or plastic and/or ceramics, and/or of a combination of these elements.

In a preferred alternative, the resistive medium consists of a web, or else of two superposed webs, or three superposed webs, or four superposed webs, or five superposed webs, or more than five superposed webs. The webs may be calendered with each other.

In a preferred embodiment, the nominal cut-off threshold of the resistive medium, i.e. the minimum size of particles which may not cross the resistive medium, is less than 1 mm, preferably less than 500 µm, preferably less than 250 µm, preferably less than 100 µm, preferably less than 50 µm.

The spacing device 13 preferably confers a quasi-constant height to the compression chamber. It is located in the compression chamber, i.e. between the resistive medium layer 12 and the floor 11.

Preferably, the spacing device 13 is not part of the floor 11. It is a distinct part, and not machining on a face of the floor 11.

The spacing device 13 inserted in the compression chamber preferably has a height greater than or equal to 1 mm and less than or equal to 100 mm, notably less than or equal to 50 mm, or less than or equal to 10 mm, or less than or equal to 5 mm.

The spacing device 13 supports the resistive medium layer 12 and makes it possible to control the height of the compression chamber in order to control the velocity of the fluid, while minimizing the volume of the compression chamber.

The spacing device 13 may consist of a single part or of several parts, which may for example be brazed with each other, which facilitates assembling and maintenance.

The parts of the spacing device may be superposed along the main axis of the column and/or be distributed according to a tessellation of the surface perpendicular to the main axis of the column.

For example, the spacing device may consist of several parts, such as several grids (two or more than two) stacked in layers.

In a preferred alternative, a stacking of the spacing device 13 and of the resistive medium is prefabricated. The spacing device 13 may for example be brazed to the resistive medium or preferably be compressed with the resistive medium. This securement allows simplified assembling and maintenance.

The spacing device 13 may consist in a non-exhaustive way of washers, grid(s) or grating(s), flat supports or foams. According to an advantageous embodiment, it is a grating positioned flat between the floor 11 and the resistive medium layer 12, having a thickness from 1 to 5 mm, notably from 2 to 4 mm, and having meshes the diameter (in the sense discussed above) of which is of at least 1 cm, preferably at least 2 cm.

The spacing device 13 may consist in a non-limiting way of plastic, of ceramics, of metal and/or of a combination of these materials.

In a preferred alternative, the spacing device 13 generates a pressure drop along current lines in the compression chamber which is less than the pressure drop in the resistive medium, preferably at least twice less, preferably at least ten times less, preferably at least a hundred times less.

Attachment elements 14, 17 ensure the attachment of the resistive medium layer 12 to the upper floor 11, as well as the securing of the spacing device 13 between the resistive medium layer 12 and the upper floor 11. By means of the attachment elements 14, 17, any substantial deformation of the resistive medium layer 12 is avoided when the fluid flows in the column.

The attachment elements 14, 17 may for example be welding, weaving, calendering, sintering, screwing, riveting elements or a combination thereof.

The attachment elements 14, 17 may consist in a non-limiting way of plastic, of ceramics, of metal and/or of a combination of these materials. For example it is possible to use in a non-limiting way screwed pins, nuts, clamping plates, gratings, slatted gratings, rivets, etc.

According to an alternative of the invention, the attachment elements 14, 17 are integrated with the spacing device 13, with which they form a single and same part.

The attachment elements 14, 17 may be separated or be integrated to a same structure (totally or partially), for example a set of rods or plates supported on the resistive medium layer 12 by means of securing means such as bolts.

One or several elements which are leak-tight with respect to the stationary phase may be added to the attachment elements, notably at the periphery of the resistive medium layer. They may be partly permeable to fluid. The leak-tight elements may for example consist of an elastomer (notably EPDM, silicone, Viton®), of plastic material (for example polyethylene or polypropylene, fluorinated polymers), of metal or of ceramics. These leak-tight elements are intended to ensure leak-tightness of the resistive medium layer 12 with respect to the stationary phase, and thus prevent the stationary phase from leaving the column.

The attachment elements may comprise peripheral attachment elements 17 ensuring the attachment of the end of the resistive medium layer 12 to the main body 6 of the column, or to the floor 11 in the vicinity of the main body 6 of the column. They may also comprise central attachment elements 14 ensuring the attachment of the resistive medium layer 12 directly to the upper floor 11 in several points distributed over the surface of this upper floor 11.

The fluid collection device 10 has a configuration similar to that of the fluid supply device 9 and the entirety of the above description therefore applies mutatis mutandis. In particular, a resistive medium layer 22 is attached to the lower floor 21 on the totality (or substantially the totality) of its surface, on its internal face (i.e. facing the bed of particles 3). Between the resistive medium layer 22 and the lower floor 21, a spacing device 23 is inserted, which maintains a spacing for fluid circulation between the lower floor 21 and the resistive medium layer 22.

Preferably, the spacing device 23 is in contact both with the lower floor 21 and the resistive medium layer 22.

Attachment elements 24, 27 ensure the attachment of the resistive medium layer 22 to the lower floor 21, and thus the securing of the spacing device 23 between the resistive medium layer 22 and the lower floor 21. They may comprise peripheral attachment elements 27 and central attachment elements 24 as described above.

With reference to FIG. 3, each resistive medium layer includes a plurality of resistive medium parts 31, which are juxtaposed so as to ensure tessellation of the surface of the floor. The term "juxtaposed" is meant in the present application as referring to a side by side arrangement in directions perpendicular to the general direction of flow (axis of the column). For example, for a planar or quasi-planar floor, the juxtaposition of the resistive medium parts is carried out parallel (or substantially parallel) to the plane of the floor.

Between the juxtaposed resistive medium parts 31, sealed joints are preferably provided as this will be described in more detail below.

The resistive medium layer preferably has a substantially constant thickness (perpendicularly to the floor, parallel to the general direction of flow).

Two possible examples of tessellation by juxtaposition of parts are illustrated in the left portion and the right portion of the figure. These resistive medium parts 31 advantageously have a geometrical shape having at least one isomorphism.

For example, the resistive medium parts 31 may be in the shape of squares, of rectangles, of triangles, of discs or disc sections, or any shape having a circular arc on one of its sides.

Preferably, the resistive medium parts 31 have a perimeter which includes at least one rectilinear (or substantially rectilinear) segment, for example at least two rectilinear (or substantially rectilinear) segments which facilitates the construction of the resistive medium layer and its attachment to the floor.

The resistive medium layer may thus include 2 resistive medium parts or 3 resistive medium parts or 4 resistive medium parts or 5 resistive medium parts or 6 resistive medium parts or 7 resistive medium parts or 8 resistive medium parts or 9 resistive medium parts or 10 to 20 resistive medium parts or 20 to 30 resistive medium parts or more than 30 resistive medium parts.

This embodiment makes it possible to facilitate assembling of the fluid distribution device by an operator working inside the column. Also, the maintenance of the fluid distribution device is facilitated for the same reasons.

The spacing device may itself consist of several parts, either connected or not.

According to an alternative, the number of parts of resistive medium and of the spacing device is the same.

According to another alternative, this number is different. For example, it is possible to provide a single spacing device part for covering the whole surface of the floor in association with several resistive medium parts.

According to an alternative, at least some resistive medium parts (preferably the totality) are flexible and have a size greater than the manholes made in the ferrule at the cell level. The flexibility of the resistive medium thus makes it possible to minimize the number of resistive medium parts for a given column surface.

According to an alternative, the resistive medium layer has uniform fluid permeability over the entirety of the surface of the fluid distribution device.

According to another alternative, the resistive medium layer has variable fluid permeability in different points of the fluid distribution device.

For example, a more resistive medium may be placed towards the center of the device, or facing each injection point. Thus, with reference to FIG. 4, the resistive medium layer may consist of a central portion 32a, of an intermediate portion 32b positioned concentrically around the central portion 32a, and of a peripheral portion 32c concentrically positioned around the intermediate portion 32b. Each portion may consist of a single part or of several resistive medium parts. Preferably, the central portion 32a has a lower permeability than the intermediate portion 32b, which itself has a lower permeability than the peripheral portion 32c.

By using different resistivities depending on the position it is possible to ensure a quasi-identical permeation rate at any point of the system.

Preferably, the joints between the different resistive medium parts are covered with a material which is impermeable to the stationary phase (and preferably also impermeable to the fluid). According to an embodiment, this function is performed by all or part of the attachment elements, which then comprise junction elements ensuring both the attachment of the resistive medium parts to the floor and the covering of the adjacent peripheries of resistive medium parts.

The junction elements may comprise one or several supporting plates and a seal gasket, as well as clamping means (such as bolts for example).

With reference to FIG. 5, according to an alternative (left portion of the figure), a fluid supply conduit is associated with the cell. The corresponding single injection point 15 is preferably positioned at the center of the fluid supply device.

According to another alternative (right portion of the figure), a plurality of fluid supply conduits or a single supply divided into several branches for supplying the cell are associated with the cell. The corresponding multiple injection points 15 are preferably distributed substantially uniformly over the surface of the fluid supply device.

A single resistive medium part may be associated with each injection point 15. Alternatively, the number or the position of the resistive medium parts may be de-correlated from the injection points.

Thus, the fluid may be injected in several points in the column floor. In a preferred alternative, the number of injection points in at least one cell is two or three or four or five or six or seven, or even more than seven. The benefit of multiplying the injection points is the reduction in the distance traveled by the fluid before the permeation through the distributor, and a reduction in the pressure drop in the distributor.

The above considerations relating to the number and to the position of the injection points apply in the same way as regards a fluid collection device.

With reference to FIG. 6, a deflector 18 (or baffle) may be placed at at least one of the injection points 15 for the fluid (for example at all the injection points of the fluid). The deflector 18 makes it possible to improve the change in direction of the fluid. The flow of the fluid thus passes from an axial direction to a radial (or parallel to the resistive medium layer 12) direction in the case of injection, and from a radial direction to an axial direction in the case of collecting/drawing off. Preferential flows are thus avoided at the injection points 15.

The deflector 18 may be maintained by the attachment elements described above.

Also it may be connected, for example brazed, on the resistive medium layer 12 (see FIG. 7a).

It may also be attached, for example fixed, to the floor 11, by attachment means 19a. The floor may also be locally conical in order to allow this attachment (see FIG. 7b).

The baffle may be partly permeable to the fluid. Its surface area may vary between 0.5 times and 5 times (or 10 times) the section of the injection point 15.

In another alternative (not shown), a baffle is placed inside the compression chamber at the inlet or outlet of the cell. The baffle is of a smaller dimension than that of the floor, so that the fluid covers a path of approximately identical length, regardless of its position with respect to the center of the column. Preferably, this baffle is maintained sandwiched between parts of the spacing device (said parts may for example form layers of the spacing device, for example superposed grids).

Figure 8A:
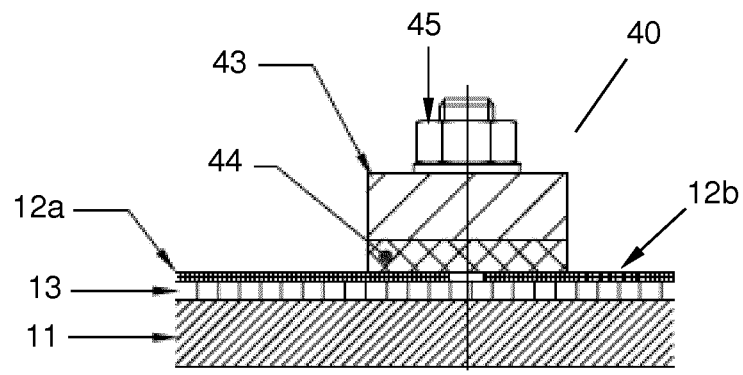

With reference to FIG. 8a, an exemplary attachment element, a so-called junction element 40 is illustrated. This junction element 40 ensures the assembling, the attachment and the clamping of two resistive medium parts 12a and 12b, as well of the spacing device 13 against the floor 11. A screwing orifice (not shown) is made in the floor 11, allowing the attachment of a bolt 45. The screw of the bolt goes through the assembly and the spacing device 13 and is housed in the floor 11.

A joint 44 as well as a supporting plate 43 acting as a holding device may be provided between the bolt 45 and the resistive medium layer 12. The shape of the joint 44 and of the supporting plate 43 makes it possible to cover the junction area of the resistive medium parts 12a, 12b.

Such a junction element 40 is notably adapted for attaching resistive medium parts on their perimeter. The supporting plate 43 is advantageously rigid and makes it possible to press the joint 44 over the whole perimeter of the resistive medium parts 12a, 12b. The joint 44 prevents the stationary phase from leaving the relevant cell and prevents preferential passages of liquid. A washer is associated with the bolt 45, notably for sealing purposes (above the supporting plate 43).

Other bolts (not shown) may be associated with the same supporting plate 43.

Figure 8B:
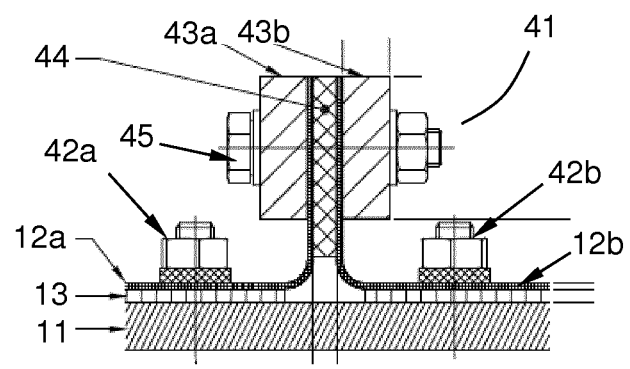

With reference to FIG. 8b, another exemplary attachment element, a so-called junction element 41, is illustrated. It is notably suitable for attachment of two resistive medium parts to each other, at their junction. The junction element 41 includes a bolt 45 which clamps the ends of both resistive medium parts 12a, 12b with two respective attachment plates 43a, 43b on either side of the resistive medium parts 12a, 12b. At least one washer, or even two on either side of the attachment plates 43a, 43b, are provided. A sealing element 44 is positioned between both resistive medium parts 12a, 12b in order to ensure leak-tightness with respect to the stationary phase. Other bolts (not shown) may be associated with the same set of attachment plates 43a, 43b.

Other attachment elements 42a, 42b allow the attachment of the respective resistive medium parts 12a, 12b to the floor 11. Each of these attachment elements 42a, 42b includes a bolt attached in the floor 11 and through the resistive medium part 12a, 12b and the spacing device 13. A sealing element (washer) is positioned at the interface between the attachment element 42a, 42b and the resistive medium part 12a, 12b.

Figure 8C:
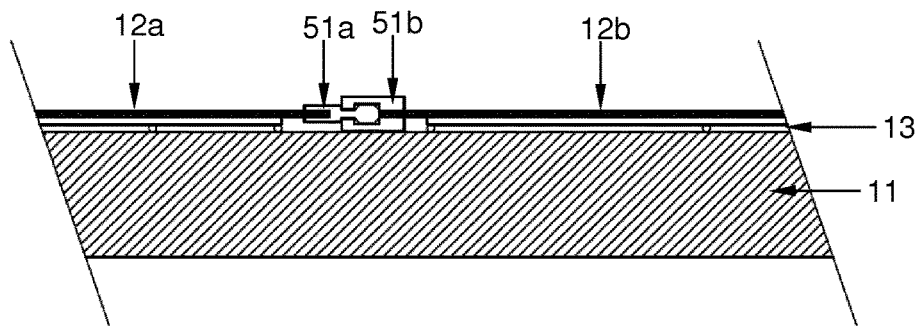

In FIG. 8c another embodiment of the assembly of the resistive medium parts 12a, 12b together is illustrated. This assembly involves respective clip-fastening elements 51a, 51b which are attached (for example by welding) to the edges facing the resistive medium parts 12a, 12b.

Figure 8D:
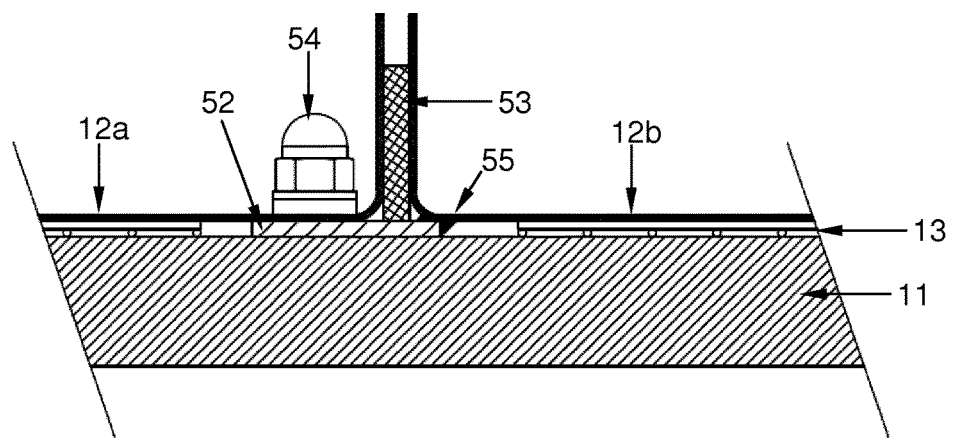

FIG. 8d illustrates another embodiment of the assembly of resistive medium parts 12a, 12b together and of their attachment to the floor 11. The assembly involves a plate 52 positioned against the floor 11. This plate 52 may be part of the spacing device 13 or else be positioned in a free space of the spacing device 13.

One of the resistive medium parts 12a is attached to the plate 52 and to the floor 11 by at least one bolt 54, in a similar way to what was described above in connection with FIG. 8a. The other resistive medium part 12b is also attached to the plate 52, for example by a weld 55 (an attachment with other bolts would also be possible). A joint 53 may be provided, attached between the ends of both resistive medium parts 12a, 12b which extend beyond the attachment points. This joint 53 may for example be in the shape of a plate oriented perpendicularly to the plate 52.

Figure 8E:
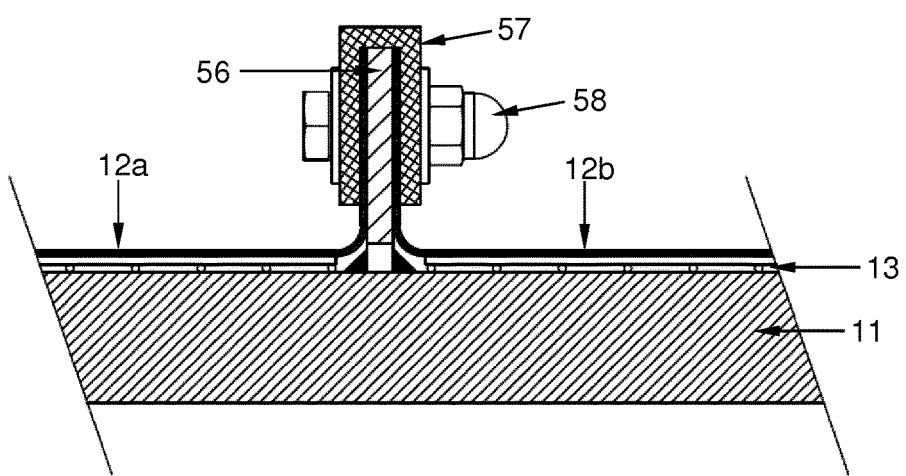

FIG. 8e further illustrates another embodiment of the assembly of resistive medium parts 12a, 12b together and their attachment to the floor 11. The assembly is an alternative of the one described above in connection with FIG. 8b. In this alternative, the edges of the adjacent resistive medium parts 12a, 12b are clasped by a joint 57 having a U-profile. An attachment plate 56 is positioned between the edges of the resistive medium parts 12a, 12b. A bolt 58 (or several bolts) ensures the maintaining and the clasping of the assembly.

Figure 8F:
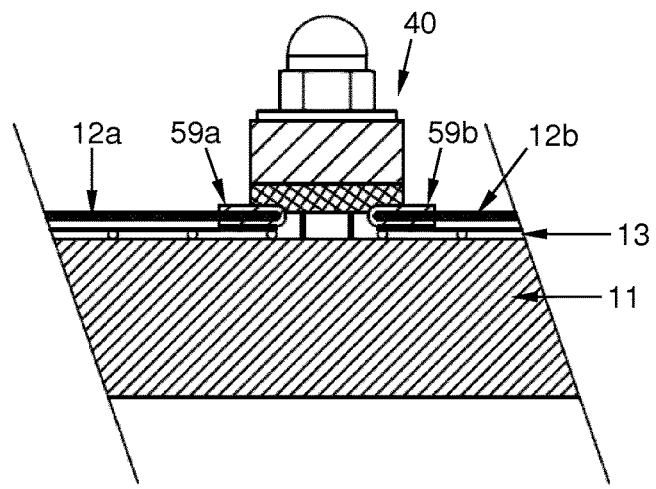

FIG. 8f further illustrates another embodiment of the assembly of resistive medium parts 12a, 12b together and their attachment to the floor 11. The assembly is an alternative of the one described above in connection with FIG. 8a. In particular it involves the same junction element 40 as in this figure, with a bolt, washer, joint and supporting plate (it being understood that several such junction elements may be provided). In this alternative, the edges facing the adjacent resistive medium parts 12a, 12b are provided with end plates 59a, 59b. These end plates 59a, 59b may for example be welded to the respective bodies of the resistive medium parts 12a, 12b. They may extend on only one of the faces of the resistive medium parts 12a, 12b or on both faces, or further they may have a U-shape and thus clasp the edges of these parts. In the illustrated example, the joint of the junction element 40 is directly supported on the end plates 59a, 59b.

Figure 8G:
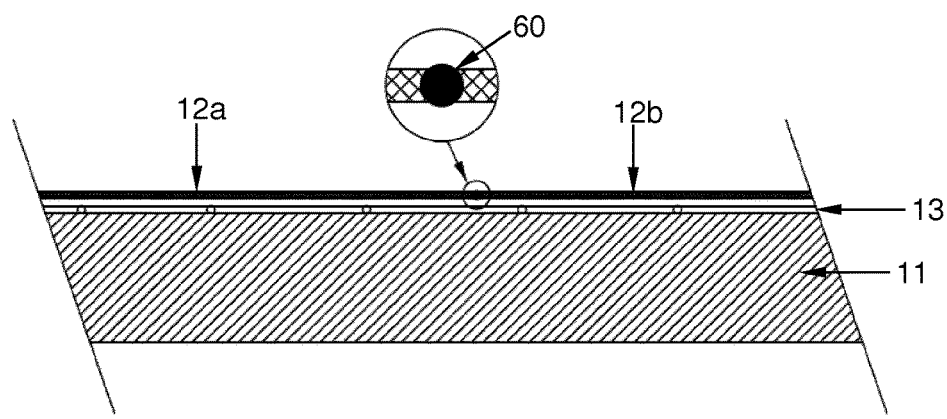

FIG. 8g illustrates another embodiment of the assembly of resistive medium parts 12a, 12b together. In this embodiment, the adjacent resistive medium parts 12a, 12b are simply attached by one or several welds 60 along their facing edges.

Figure 8H:
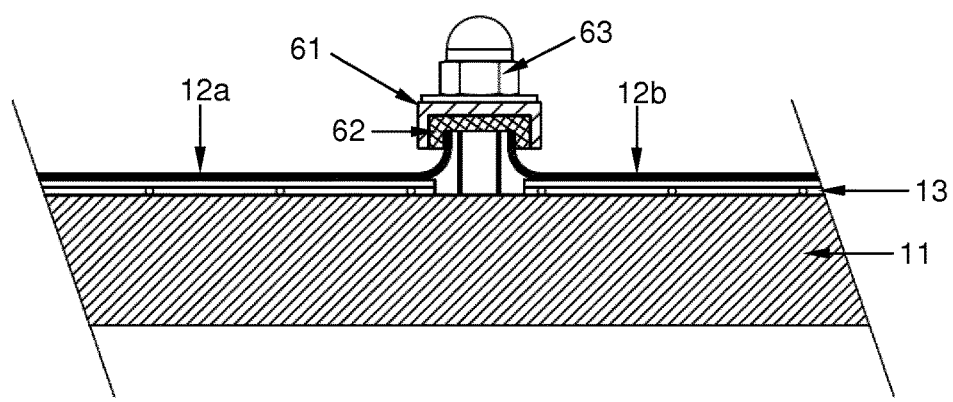

FIG. 8h illustrates yet another embodiment of the assembly of resistive medium parts 12a, 12b together and their attachment to the floor 11. The principle of the assembling is very close to that of FIG. 8a. Here also, the assembling and the attachment are ensured by a bolt 63 (or several bolts), which presses on a supporting plate 61, which is itself above a joint 62. In this alternative, the supporting plate 61 and the joint 62 each have a U shape, the branches of the U being directed towards the floor 11. In this way, the edges of the resistive medium parts 12a, 12b are clasped between the joint 62 and the body of the screw of the bolt 63.

Figure 8I:
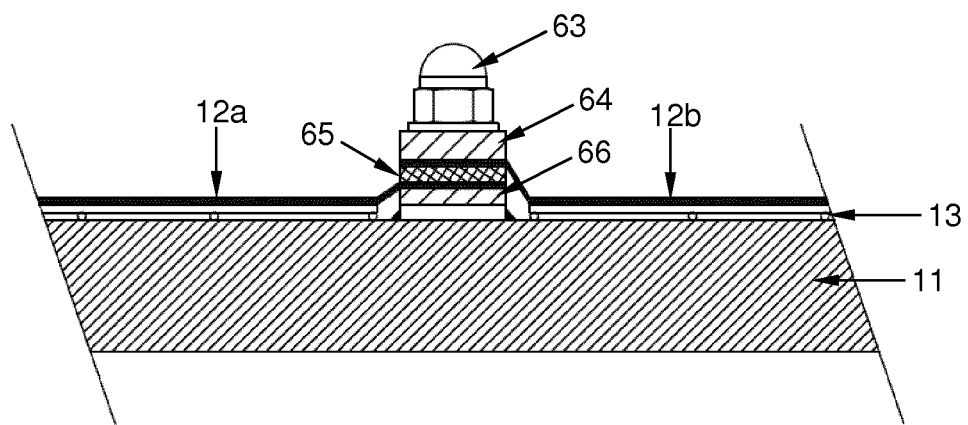

FIG. 8i further illustrates another alternative attachment according to FIG. 8a. Here, two supporting plates 64, 66 and a joint 65 are provided. The edges facing the resistive medium parts 12a, 12b are positioned on either side of the joint 65, which is positioned parallel to the floor 11. These edges are moreover clasped on either side respectively by the two supporting plates 64, 66. The clamping and the attachment of the assembly is ensured by a bolt 63 as described above (or several of them).

Figure 8J:
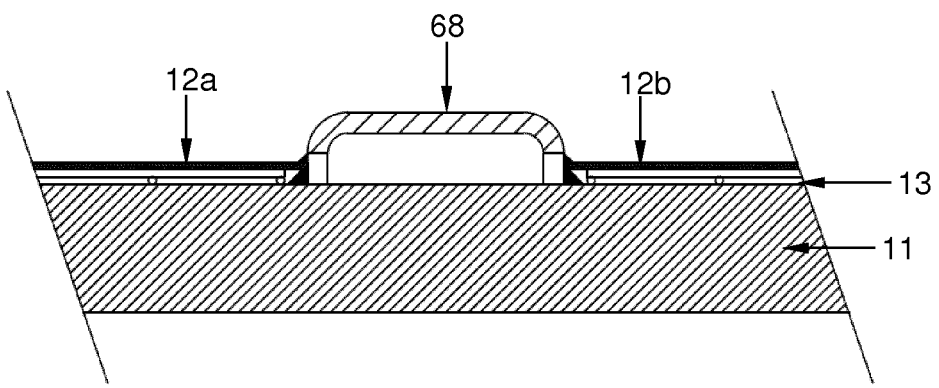

FIG. 8j further illustrates another embodiment of the assembly of resistive medium parts 12a, 12b together and their attachment to the floor 11. This embodiment involves a channel 68, which is a U profile. This channel 68 may be attached to the floor 11, for example by welding. It may be positioned in a free space of the spacing device 13. The adjacent resistive medium parts 12a, 12b are attached to the channel 68 along it, for example by welding. It is possible to provide orifices along the channel 68, in its portion located between the resistive medium parts 12a, 12b and the floor 11. These orifices allow free fluid circulation in the space located between the floor 11 and the resistive medium layer.

The column according to the invention may be used in a chromatography, adsorption or ion exchange process, preferably in a multi-column chromatography method, such as a simulated moving bed (SMB) process, continuous ion exchange method or their alternatives known to one skilled in the art.

In another alternative, the column is used in a chemical synthesis process on a fixed bed, preferably in a catalytic process. The applications are not limiting, and the column may be used in any process known to one skilled in the art involving contact between a liquid phase and a solid phase, for example batch wise, sequentially, with co-current or with counter-current.

EXAMPLES

The following examples illustrate the invention without limiting it.

Example 1

A circular column having a diameter of one meter over a height of one meter was made, and a distributor according to the invention was used with different parameters.

In all the tests carried out, a strong cationic resin in a calcium form was used with an average particle size comprised between 300 and 320 μm. The spacing device of the lower distributor consisted of a 3 mm-high grid.

The spacing device of the upper distributor also consisted of a 3 mm-high grid. It ensured a spacing between the floor and the resistive medium of 3 mm. The assembly was attached to the floor by a set of screws and stainless steel washers.

The resistive medium ensured a pressure drop of the order of 15 mbar when water flowed at a velocity of 2 m/h at room temperature. It consisted of two plates welded to each other.

Efficiency tests were carried out at various velocities by injections of 600 mL of calcium chloride at 0.1 g/L The measured efficiencies of the device were:
690 theoretical plates at a velocity of 1 m/h;
515 theoretical plates at a velocity of 2 m/h; and
410 theoretical plates at a velocity of 3 m/h.

Example 2

In this example, the same experimental setup as in Example 1 was used again, except for the resistive medium itself. Its composition was substantially different, as it did not comprise any elements welded together. The generated pressure drop remained at 15 mbar during a water flow at a velocity of 2 m/h at room temperature.

Efficiency tests were carried out at various velocities with injections of 600 mL of calcium chloride at 0.1 g/L The measured efficiencies of the device were:
660 theoretical plates at a velocity of 1 m/h;
480 theoretical plates at a velocity of 2 m/h; and
400 theoretical plates at a velocity of 3 m/h.

Example 3

In this example, the same experimental setup as in Example 2 was used again, except for the additional presence of a deflector having a diameter of 80 mm, a thickness of 1 mm, and maintained at a 1 mm spacing from the injection point.

Efficiency tests were carried out at various velocities with injections of 600 mL of calcium chloride at 0.1 g/L The measured efficiencies of the device were:
670 theoretical plates at a velocity of 1 m/h;
500 theoretical plates at a velocity of 2 m/h; and
420 theoretical plates at a velocity of 3 m/h.

Example 4

In this example, the same experimental setup as in Example 1 was used again except for the fact that the resistive medium had a pressure drop of the order of 10 mbar when water flowed at a velocity of 2 m/h at room temperature. The resistive medium was made in one piece.

Efficiency tests were carried out at various velocities with injections of 600 mL of calcium chloride at 0.1 g/L The measured efficiencies of the device were:
615 theoretical plates at a velocity of 1 m/h;
500 theoretical plates at a velocity of 2 m/h; and
415 theoretical plates at a velocity of 3 m/h.

Example 5

In this example, the same experimental setup as in Example 4 was used again except for the fact that the spacing device was formed with a set of stainless steel washers, maintained with screws. A spacing of 4.5 mm was thus ensured between the floor and the resistive medium.

The resistive medium had a pressure drop of the order of 10 mbar when water flowed at a velocity of 2 m/h at room temperature. The resistive medium consisted of two plates welded to each other.

Efficiency tests were carried out at various velocities with injections of 600 mL of calcium chloride at 0.1 g/L The measured efficiencies of the device were:
660 theoretical plates at a velocity of 1 m/h;
460 theoretical plates at a velocity of 2 m/h; and
365 theoretical plates at a velocity of 3 m/h.

The invention claimed is:

1. A column cell comprising:
    a fluid supply device; and
    a fluid collection device,
    wherein the fluid supply device comprises:
        a first floor including at least one injection point ensuring a fluidic connection on either side thereof;
        a first resistive medium layer attached to the first floor and formed with a plurality of resistive medium parts juxtaposed on a face of the first floor in a side-by-side arrangement perpendicular to a general direction of a flow, the first resistive medium layer being permeable to fluid; and
        a first spacing device inserted between the first floor and the first resistive medium layer and maintaining a spacing for fluid circulation between the first floor and the first resistive medium layer,
    wherein the fluid collection device comprises:
        a second floor including at least one injection point ensuring a fluidic connection on either side thereof;
        a second resistive medium layer attached to the second floor and formed with a plurality of resistive medium parts juxtaposed on a face of the second floor in a side-by-side arrangement perpendicular to the general direction of a flow, the second resistive medium layer being permeable to fluid; and
        a second spacing device inserted between the second floor and the second resistive medium layer and maintaining a spacing for fluid circulation between the second floor and the second resistive medium layer,
    wherein the general direction of the flow is from the first floor to the first spacing device to the first resistive medium layer to the second resistive medium layer to the second spacing device and then to the second floor.

2. The column cell according to claim 1, wherein:
    at least one of the first floor and the second floor is not machined; and/or
    at least one of the first floor and the second floor has a diameter greater than 1 meter.

3. The column cell according to claim 1, wherein at least one of the first resistive medium layer and the second resistive medium layer includes from two to two hundred resistive medium parts.

4. The column cell according to claim 1, further comprising attachment elements maintaining (i) an assembly formed by the first resistive medium layer and the first spacing device against the first floor, and/or (ii) an assembly formed by the second resistive medium layer and the second spacing device against the second floor.

5. The column cell according to claim 1,
    wherein the first spacing device between the first floor and the first resistive medium layer is substantially constant over a totality of surface of the first floor, and/or
    wherein the second spacing device between the second floor and the second resistive medium layer is substantially constant over a totality of surface of the second floor.

6. The column cell according to claim 1, wherein at least one of the first floor and the second floor is substantially planar and has deviations from 0.5 mm to 5 mm with respect to a planar geometry.

7. The column cell according to claim 1, wherein water flowing through the fluid supply device and the fluid collection device at 1 m/h at 20° C. induces a pressure drop of less than or equal to 50 mbar.

8. The column cell according to claim 1, wherein the first spacing device generates a first pressure drop between the first floor and the first resistive medium layer, a second pressure drop is generated in the first resistive medium layer, and the first pressure drop is less than the second pressure drop.

9. The column cell according to claim 1, comprising a deflector placed in at least one injection point of the first floor or the second floor.

10. The column cell according to claim 1, wherein at least one of the first spacing device and the second spacing device is composed of a set of supports, of a grid or of a foam.

11. The column cell according to claim 1, wherein the resistive medium parts of at least one of the first resistive medium layer and the second resistive medium layer are composed of one or several webs, perforated plates, powders or combinations thereof.

12. The column cell according to claim 1, wherein at least one of the first floor and the second floor includes a plurality of injection points.

13. A column including at least one column cell according to claim 1, the at least one column cell including a bed of particles between the fluid supply device and the fluid collection device.

14. The column according to claim 13, further comprising fluid conduits that are (i) connected to injection points of the fluid supply device and the fluid collection device and (ii) allow fluid to be brought to the fluid supply device or the fluid collection device.

15. The column according to claim 13, wherein at least one of the first floor and the second floor is attached to supporting beams.

16. The column according to claim 13, wherein the column is a chromatography column.

17. A method for setting up a fluid supply device and a fluid collection device in a column including at least one cell intended to contain a bed of particles, the fluid supply device comprising (i) a first floor including at least one injection point ensuring a fluidic connection on either side thereof, (ii) a first resistive medium layer attached to the first floor and formed with a plurality of resistive medium parts juxtaposed on a face of the first floor in a side-by-side arrangement perpendicular to a general direction of a flow, the first resistive medium layer being permeable to fluid, and (iii) a first spacing device inserted between the first floor and the first resistive medium layer and maintaining a spacing for fluid circulation between the first floor and the first resistive medium layer; the fluid collection device comprising (i) a second floor including at least one injection point ensuring a fluidic connection on either side thereof, (ii) a second resistive medium layer attached to the second floor and formed with a plurality of resistive medium parts juxtaposed on a face of the second floor in a side-by-side arrangement perpendicular to the general direction of a flow, the second resistive medium layer being permeable to fluid and (iii) a second spacing device inserted between the second floor and the second resistive medium layer and maintaining a spacing for fluid circulation between the second floor and the second resistive medium layer, wherein the general direction of the flow is from the first floor to the first spacing device to the first resistive medium layer to the second resistive medium layer to the second spacing device and then to the second floor, the method comprising:

setting into place the first spacing device against an internal face of the first floor of the cell;

setting into place the second resistive medium layer above the second spacing device, by juxtaposing the resistive medium parts;

attaching the first resistive medium layer on the first floor so as to secure the first spacing device between the first resistive medium layer and the first floor;

setting into place the second spacing device against an internal face of the second floor of the cell;

setting into place the second resistive medium layer above the second spacing device, by juxtaposing the resistive medium parts; and attaching the second resistive medium layer on the second floor so as to secure the second spacing device between the second resistive medium layer and the second floor.

18. The method according to claim 17, wherein the setting into place of the first resistive medium layer and/or the second resistive medium layer comprises introducing the resistive medium parts into the cell through a manhole.

19. The method according to claim 17, wherein the setting into place of the first spacing device and the setting into place of the first resistive medium layer are carried out:

either sequentially, one or several parts of the first spacing device being positioned against the internal face of the first floor and then the resistive medium parts of the first resistive medium layer being attached above the first spacing device;

or simultaneously, one or several spacing device parts being pre-assembled with the resistive medium parts of the first resistive medium layer before positioning and attaching the first spacing device against the internal face of the first floor together with the first resistive medium layer; and/or wherein the setting into place of the second spacing device and the setting into place of the second resistive medium layer are carried out:

either sequentially, one or several parts of the second spacing device being positioned against the internal face of the second floor and then the resistive medium parts of the second resistive medium layer being attached above the second spacing device;

or simultaneously, one or several spacing device parts being pre-assembled with the resistive medium parts of the second resistive medium layer before positioning and attaching the second spacing device against the internal face of the second floor together with the second resistive medium layer.

* * * * *